United States Patent

[11] 3,616,187

| [72] | Inventors | Gerhard Ottmann;<br>Clemens Lilienbeck, both of Wuppertal-Barmen, Germany |
|---|---|---|
| [21] | Appl. No. | 765,040 |
| [22] | Filed | Oct. 4, 1968 |
| [45] | Patented | Oct. 26, 1971 |
| [73] | Assignee | Kurt Herberts & Co. Vorm. Otto Louis Herberts<br>Wuppertal-Barmen, Germany |
| [32] | Priority | Feb. 29, 1968 |
| [33] | | Germany |
| [31] | | H 065441 |

[54] PACKAGING FOIL
11 Claims, No Drawings

[52] U.S. Cl. ............................................. 161/189,
161/184, 161/190, 161/227, 161/231, 161/252
[51] Int. Cl. ..................................................... B32b 27/30,
B32b 27/40
[50] Field of Search ............................................. 161/189,
190, 184, 227, 231, 252

[56] References Cited

UNITED STATES PATENTS

| 3,111,450 | 11/1963 | Stevens | 161/190 X |
|---|---|---|---|
| 3,133,854 | 5/1964 | Simms | 161/189 |
| 3,178,394 | 4/1965 | Christenson | 161/190 X |
| 3,257,261 | 6/1966 | Hochberg | 161/190 X |
| 3,315,380 | 4/1967 | Mack et al. | 161/184 X |
| 3,325,344 | 6/1967 | Semancik et al. | 161/218 |
| 3,359,153 | 12/1967 | Bean | 161/189 |
| 3,369,959 | 2/1968 | Noyes | 161/189 |
| 3,459,582 | 8/1969 | Swerlick | 161/252 X |

*Primary Examiner*—Harold Ansher
*Attorney*—Oberlin, Maky, Donnelly & Renner

ABSTRACT: Packaging foil comprising a flexible support foil, a top layer of a vinyl polymer and an adhesion promoter or primer between the support foil and top layer, wherein the primer is a mixture of a chlorine or fluorine-containing polymer and an organic compound with at least two isocyanate groups.

PACKAGING FOIL

The present invention relates to a packaging or wrapping foil comprising a flexible support foil, a top layer of vinyl polymer and an adhesion promoter between the support foil and top layer.

Packaging foils are known which consist of a support foil and a top layer. According to the prior art, it is mainly foils of polyester, cellular glass or polypropylene which have so far been used as support foils. However, because these foils have an undesirable steam and gas permeability, they are consequently provided with a coating which has a polyvinylidene chloride (PVDC) or polyvinyl chloride (PVC) base. The PVDC or PVC coatings are produced by applying a dispersion or solution of PVDC or PVC to the support foils and evaporating the solvent or dispersion agent. However, the PVDC or PVC However, the PVDC and PVC coatings produced in this way have an insufficient bonding strength with respect to the support foils which are based on synthetic plastics materials. Consequently, it has already been proposed to use so-called adhesion promoters. Solutions or dispersions of these adhesion promoters are applied to the support foil and the solvent contained therein is evaporated. Thereafter, the top layer, based on PVDC or PVC, is applied in the manner described above. Known adhesion promoters (primers) include solutions or dispersions which are based on polymeric alkylene imines (see German Auslegeschrift No. 1204559), polyamides, acrylates, isocyanates in combination with polyesters and/or polyethers, and epoxy compounds in combination with amines and polyamines.

These known packaging or wrapping foils have the disadvantage that there is an insufficient adhesion between the top layer and support foil. This becomes particularly apparent when these foils are kept for a relatively long time under conditions similar to tropical conditions. The insufficient adhesion results in the foils losing the desirable impermeability to steam and gas and being liable to be easily damaged. Since foils are widely used for packaging, for example, foods, for long periods, any damage to the foils in the manner indicated above leads to the wrapped products being unsuitable for practical use. The present invention has for its object to avoid these disadvantages.

It has surprisingly been found that an excellent adhesion between a support foil and a coating which is based on vinyl polymers can be obtained, even under storage conditions similar to those in the tropics, by using adhesion promoters or primers with a special composition.

The present invention provides packaging foil comprising a flexible support foil, a top layer of a vinyl polymer, and an adhesion promoter or primer between the support foil and top layer, wherein the primer is a mixture of:

a. A polymer of a compound of the general formula

 (I)

wherein X represents chlorine or fluorine and A represents hydrogen or has the same meaning as X, and b. a compound selected from the group consisting of an isocyanate of the formula:

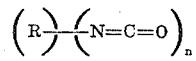

wherein R represents hydrocarbyl having from one to 18 carbon atoms; cyclohydrocarbyl having from five to 12 carbon atoms; single, multiple and fused ring aryl radicals having from six to 20 carbon atoms; Y—Z—Y wherein Z represents hydrocarbyl having from one to three carbon atoms and Y represents single, multiple and fused aryl and cyclohydrocarbyl radicals having from five to 20 carbon atoms; and $n$ is an integer of at least 2 which corresponds to the valence of R; and a polyurethane of the formula:

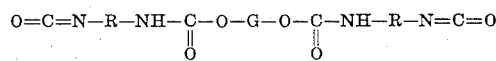

wherein R is as above and G is a long chain polymeric radical free from substituents reactive with an isocyanate and having a molecular weight above 480.

Illustrative of compounds of the above formulas are:
Hexamethylene-1,6-diisocyanate, (Desmodur H),
Toluene-2,4-diisocyanate, (Desmodur T 2,4; Mondur TDS; Naccomate 100)
Naphthalene-1,5-diisocyanate, (Desmodur 15; Multrathane N 5)
Diphenylmethane-4,4—diisocyanate, (Multrathane M; Desmodur 44; Naccomate 300)
Triphenylmethane-4,4′,4″-triisocyanate, (Desmodur R; Mondur TM) and Polyurethane, formed by reaction of a OH-group containing polyester with a mixture of toluene-2,4-diisocyanate and toluene-2,6-diisocyanate, (Desmophen VL 100).

As top layer with a vinyl polymer base, it is likewise advantageous to use a polymer of a compound of the general formula

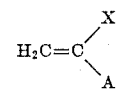

in which X and A have the meanings given above. Polymers which are preferred are those of compounds of the above formula in which X represents chlorine and A represents chlorine or hydrogen. This also applies in respect of the component (a) of the primer.

Such polymers are the aforementioned PVDC or the PVC. Dispersions or solutions of these polymers are conventional commercial products which are produced on a large industrial scale and are known, for example, under Trade Marks such as Saran (Dow Chemical Co.), Diofan (Badische Anilin and Soda-Fabrik, Ludwigshafen), and Ixan (Solvay, Brussels). Some of these products are not pure homo-polymers, but the polymers contain other monomers which can be copolymerized with the compounds of the above formula and which are incorporated by polymerization. In accordance with the present invention, by polymers of the general formula

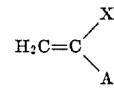

there are also to be understood those polymers which, in accordance with the prior art, contain minor quantities of comonomers. The quantity of these comonomers can be up to 25% of the total weight. Examples of suitable comonomers include acrylates, acrylonitriles, methacrylates, methacrylonitriles, vinyl chloride, styrene, maleates, vinyl esters, allyl crotonates, butadiene and epoxy compounds.

Such copolymers can likewise be used as component (a) of the primer of the packaging foil according to the invention. The comonomer is preferably so selected that copolymers are obtained which have an improved solubility with respect to PVDC. A technical disadvantage of pure PVDC is that it is comparatively sparingly soluble in easily accessible solvents. The use is thus facilitated by using, in the foregoing sense, copolymers which show an improved solubility in conventional solvents, such as ethyl acetate methyl ethyl ketone, acetone or mixtures of these solvents. The reason for this is that the primer is applied in the form of a solution to the flexible support foil which is to be coated.

The component (a) of the primer of the packaging foil according to the invention contains the copolymerized monomeric compounds, advantageously in a quantity of 1 to 50 percent by weight based on the total weight of the component (a). Especially preferred are those polymers in which the copolymerized compounds are present in a quantity of 10 to 30 percent by weight, based on the total weight of the component (a). Such polymers show a good solubility in the aforementioned solvents and as a consequence can be handled particularly easily technically.

The degree of polymerization of the compounds of general formula I, i.e., the molecular weight of these polymers, has the usual values, i.e., it is possible to use polymers with molecular weights such as those which are normal for the production of packaging foils of the aforementioned known type with a top layer having a PVDC and/or PVC base.

The conventional commercial isocyanate compounds can be used as component (b) according to the present invention, i.e., as organic compounds with at least two isocyanate groups. Diisocyanates are particularly preferred, more especially because these are easily available and are cheap. Triisocyanates or polyisocyanates with more than three isocyanate groups can, for example, also be used.

As already percent above, the component (b) is present in such quantities that the —N=C=O content of the mixture, related to the solid content of the primer mixture, amounts to at least 0.1 percent by weight. In this sense, the isocyanate content of a primer mixture containing 98.26 grams of component (a) and 1.74 grams of toluylene diisocyanate amounts to 0.84 percent by weight, since the molecular weight of toluylene diisocyanate is 174 and the weight of the two isocyanate groups in the toluylene diisocyanate is 84. 1.74 grams of toluylene diisocyanate thus contains, in accordance with this definition, 0.84 grams of isocyanate groups.

A remarkable effect on the bond strength between the support foil and the top layer is already obtained with the previously indicated lower limit of at least 0.1 by weight of isocyanate groups. A best possible bonding strength, also under tropical storage conditions, is obtained if the content of isocyanate groups, based on the solids, amounts to 2 to 7 percent by weight. With a higher proportion, the effect is generally progressively weaker. Proportions of isocyanate greater than 10 percent by weight are generally unsuitable. The best possible quantity by weight naturally depends on the type, i.e., more especially upon the molecular weight and the number of isocyanate groups in the polyisocyanate, and also on the type of the component (a).

As support foil for use in accordance with the present invention, it is possible to use foils of those materials which are also already in common use for the known packaging foils of the type hereinbefore mentioned. Especially preferred are foils of polypropylene, cellulose hydrate and polyesters, advantageously polyethylene terephthalate. In accordance with the present invention, however, foils with a base of other synthetic plastics materials, and also paper foils or metal foils, can also be used as support foils. The support foils can consist of a single web or of several foils which are stuck to one another.

The present invention is also concerned with a process for the production of the packaging foils according to the invention, wherein a flexible support layer first of all has applied thereto a solution or dispersion of a primer, the solvent of this primer layer is evaporated, then a solution or dispersion of a vinyl polymer is applied as top layer and the solvent of this top layer is evaporated, and wherein the adhesion promoter or primer comprises a solution of a mixture of:

a. A polymer of a compound of the general formula

    I wherein X represents chlorine or fluorine and A represents hydrogen or has the same meaning as X, and b. An organic compound with at least two isocyanate groups, the —N=C=O content of the mixture, related to solids, mounting to at least 0.1 percent by weight.

The process according to the invention is carried into effect in a manner known per se by first of all the solution of the primer with the composition as defined above being applied to the support foil whereupon the solvent is evaporated, and then the top layer is applied in a manner known per se and the solvent or dispersion agent of the top layer polymer is likewise evaporated.

According to the invention, the primer is conveniently applied in a quantity of 0.1 to 1 grams of dry weight per square meter. The quantity depends in detail on the required effect and on the type of support foil and top layer. The top layer is conveniently applied in known manner in a quantity of 1 to 6 grams dry weight per square meter.

Example 1

An unstretched polypropylene foil with a thickness of about 50 p. is exposed to a Corona discharge in order to make the surface capable of being stuck particularly easily and is then coated with a primer solution having the following composition:

97 parts by weight of PVDC-acrylonitrile mixed fluorine (Ixan WN of Messrs. Solvay, Brussels), Three parts by weight of toluylene diisocyanate (isocyanate content 48 percent by weight)

Seven hundred parts by weight of methyl ethyl ketone (solvent).

The solution is applied in such a quantity that after evaporation of the solvent, a quantity of 0.3 grams of solid substance is applied per square meter. The evaporation of the solvent preferably takes place at a temperature of about 40° C. while injecting air into a drying duct. A PVDC dispersion is applied to the polypropylene foil which has been coated in this way and is dried by means of infrared radiation with vigorous air movement. The quantity applied is about 5 grams of solid substance per square meter of foil. The dispersion, which is marketed under the trade name Diofan 190 D of Messrs. Badische Anilin and Soda Fabrik (BASF), Ludwigshafen, is used. The solids content of the aqueous dispersion is about 55 percent by weight. The foil which is obtained has an excellent impermeability to steam and gas. After being stored for 6 days at 40° C. and 90 percent relative air humidity no deterioration in the bonding is found.

EXAMPLE 2

A polyamide film with a surface weight of 50 grams per square meter is coated with a primer having the following composition:

Seventy parts by weight of PVDC-acrylonitrile mixed polymer (Ixan Wn. of Messrs. Solvay, Brussels), Thirty parts by weight of an isocyanate resin with reactive —N≡C≡O groups (Desmodur L of Messrs. Farbenfabriken Bayer, Leverkusen), Six hundred parts by weight of ethyl acetate.

The primer layer, dried after evaporation of the solvent as in example 1, amounts to about 1 gram per square meter. A PVDC dispersion, e.g. Ixan WA 91 of Messrs. Solvay, Brussels, is applied to the pretreated side of the foil and dried as in example 1. The applied layer thickness is 3. μ

EXAMPLE 3

Biaxially stretched polypropylene foil in a thickness of 20 μ is pretreated by a Corona discharge in known manner and coated with a primer of the following composition:

Ninety parts by weight of PVDC mixed polymer

Ten parts by weight of an isocyanate compound with a proportion of 10 percent by weight of functional —N=C=O groups, produced by reacting a linear polyester of adipic acid and diethylene glycol with diphenylmethane-4,4'-diisocyanate.

Seven hundred parts by weight of methyl ethyl ketone.

The quantity of the applied primer is so chosen that, after complete evaporation of the solvent, there remains an applied quantity of about 0.5 gram per square meter. Evaporation of the solvent and subsequent coating with PVDC dispersion is effected as in example 1.

We claim:
1. In a packaging foil comprised of a flexible support member, a top layer of vinyl polymer of a compound of the formula:

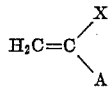

wherein X represents chlorine or fluorine and A represents hydrogen or X and an adhesion promoter disposed therebetween, the improvement comprising an adhesion promoter which is a mixture of:
 a. a polymer of a compound of the formula:

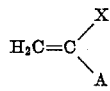

wherein X represents chlorine or fluorine and A represents hydrogen or X, and
 b. an organic composition of matter bearing at least two isocyanate moieties, with the solids content of said $-N=C=O$ moieties being from about 0.1 percent to about 10 percent by weight based upon the total weight of the mixture.

2. The packaging foil as defined by claim 1, wherein the vinyl polymer of the top layer is a polymer selected from the group consisting of polyvinylidene chloride and polyvinyl chloride.

3. The packaging foil as defined by claim 1, wherein the top layer is comprised of a copolymer of a compound of the formula:

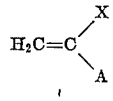

wherein X represents chlorine or fluorine and A represents hydrogen or X, and a comonomer copolymerizable therewith.

4. The packaging foil as defined by claim 1, wherein the polymer of component (a) is selected from the group consisting of polyvinylidene chloride and polyvinyl chloride.

5. The packaging foil as defined by claim 1, wherein the solids content of the said $-N=C=O$ moieties ranges from between 2 and 7 percent by weight based upon the total weight of the mixture.

6. The packaging foil as defined by claim 1, wherein the component (b) is a diisocyanate.

7. The packaging foil as defined by claim 6, wherein the diisocyanate is toluylene diisocyanate.

8. The packaging foil as defined by claim 6, wherein the diisocyanate is a polyester urethane.

9. The packaging foil as defined by claim 1, wherein the polymer of component (a) is a copolymer of a compound of the formula:

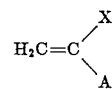

wherein X represents chlorine or fluorine and A represents hydrogen or X, and a comonomer copolymerizable therewith.

10. The packaging foil as defined by claim 9, wherein the copolymer is comprised of from between 1 and 50 percent by weight of the copolymerizable comonomer.

11. The packaging foil as defined by claim 10, wherein the copolymer is comprised of from between 10 and 30 percent by weight of the copolymerizable comonomer.